INVENTORS
EDWARD D. PHINNEY
ROBERT S. BAILEY
BY
RPMorris
ATTORNEY

INVENTORS
EDWARD D. PHINNEY
ROBERT S. BAILEY
BY R. P. Morris
ATTORNEY

Patented June 2, 1953

2,640,917

UNITED STATES PATENT OFFICE 2,640,917

AMPLIFIER AND RECEIVER SYSTEM

Edward D. Phinney, Crestwood, and Robert S. Bailey, New York, N. Y., assignors to International Standard Electric Corporation, New York, N. Y., a corporation of Delaware Application October 22, 1948, Serial No. 55,856

16 Claims. (Cl. 250—20)

This invention relates to electrical amplifier and receiver systems and more particularly to systems of the type wherein a single stage serves to perform several functions.

Systems have been proposed wherein regenerative amplification is used to secure greater amplification in a single stage. Systems of the reflex type have been proposed wherein a single stage serves simultaneously as a radio frequency and an audio frequency amplifier.

It is an object of our invention to provide an improved type of circuit wherein a plurality of different operations such as amplification and detection are performed successively by the same electrical discharge tube or stage, whereby the amount of apparatus required to produce the required result is minimized and highly efficient operation is obtained.

According to a feature of our invention, a translator is provided with a feedback circuit, to fed back for repeated amplification a discrete signal, and a control, such as a biasing circuit is provided to change the translator characteristics upon the amplification reaching a predetermined level. Thus for example, the translator may be caused to operate as an amplifier for R. F., and I. F. signals of predetermined duration, hereinafter called pulses, and thereafter, due to a change in its characteristics may be made to operate as a detector. Further feed-back of the resulting video or audio frequency pulses may be provided repeatedly to amplify them in the same translator until the pulses reach a predetermined level.

The single stage of the translator may be made to select pulse portions from a received wave and apply these portions for successive amplification, detection, etc. It is clear that the pulses must be of a repetition rate sufficient to carry the highest frequency signal to be reproduced, superaudible if the signal is voice, and that the entire sequence of operations, that is amplification and detection, and further amplification if such is desired, must take place within the normal pulse repetition period.

While we have outlined above the general objects and features of our invention, a better understanding of these and other objects and features will become apparent from the particular description of a few embodiments thereof made with reference to the accompanying drawings in which.

Figure 1:
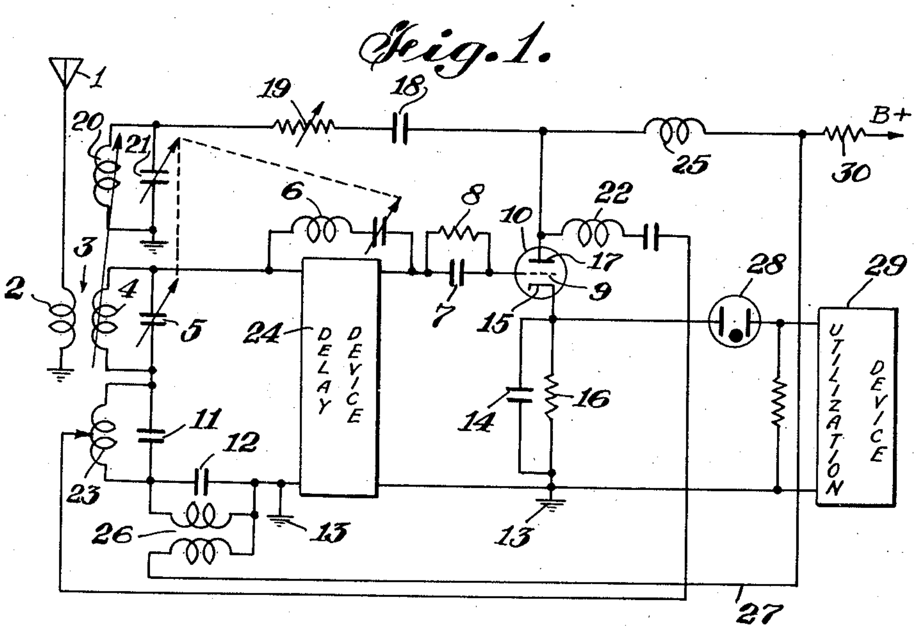
Fig. 1 is a schematic circuit diagram of a superheterodyne receiver incorporating features of our invention.

Referring now to Figure 1, the incoming signal is applied to a triode, causing the triode to burst into R. F. oscillations which are beat with the incoming signal and mixed in the triode to produce I. F. energy in pulse form. These I. F. pulses are amplified by being repeated through the triode until by the shifting of the bias on the triode, the triode operates as a detector. These I. F. pulses are then detected and the detected pulses are again amplified by being repeated through the triode until they reach a given amplitude. They are next fed to a suitable utilizaion device.

In feeding the incoming signal to the triode, the signal may be received on an antenna 1 and fed to an input coil 2 which forms the primary of an input transformer 3, whose secondary 4 is tuned by variable condenser 5 to the incoming carrier frequency. One side of condenser 5 is coupled through a series resonant circuit 6, preferably tuned to the received carrier frequency and through the usual combination of grid condenser 7 and grid leak 8 to the grid 9 of a triode 10. The other side of condenser 5 is coupled via condensers 11 and 12, ground connection 13, through cathode biasing condenser 14 to the cathode 15 of triode 10. The biasing condenser 14 is shunted by the usual resistor 16.

The application of the incoming signal to the grid 9 of triode 10 causes said tube to burst into R. F. oscillations due to feedback means provided between its anode 17 and its grid 9. In the embodiment illustrated in Fig. 1, this feedback means comprises a by-pass condenser 18, a resistor 19, a feedback coil 20, all arranged in series between the anode 17 and ground. To control the frequency of the locally produced oscillations a condenser 21 is provided in shunt across feedback coil 20 preferably forming a high Q resonant circuit. Condenser 21 is preferably ganged to tuning condenser 5 and the condenser of series resonant circuit 6. Feedback coil 20 is coupled to input coil 4. The resistor 19 serves to control the amount of energy fed back to the input circuit. Coil 20 is tuned by condenser 21 to a radio frequency sufficiently separate from that of the incoming carrier so that when the two are beat together and mixed in triode 10, an intermediate frequency is obtained.

In the absence of an incoming signal triode 10 will not oscillate due to the biasing means hereinbefore described and if necessary, for this purpose, additional bias may be provided from a steady D. C. source (not shown). When, however, the circuit thus described starts to oscillate bias is quickly built up therein such as for example across grid condenser 14 biasing the tube to block further oscillation after only a few of the locally generated oscillations have been produced. Thus there is effectively produced a radio frequency pulse which mixes with the incoming signal in triode 10 to produce an I. F. pulse in the output of triode 10. This I. F. pulse is passed through a series resonant circuit 22 which will not pass the R. F. energy. The I. F. pulse passing through circuit 22 is fed back to a coil 23 which together with condenser 11 forms a resonant circuit tuned to the intermediate frequency. One end of the circuit 22 is coupled via condenser 12 and ground connection 13 to the cathode of triode 10, the other end of said circuit being coupled via inductor 4 and through a delay means 24 and grid condenser 7 to the grid 9 of said triode. The delay means 24 is adjusted to assure separation of the successive I. F. pulses and to prevent the build up of continuous oscillation. The intermediate frequency pulse is thus repeatedly applied from the anode 17 of triode 10 through the feedback circuit including series resonant circuit 22 and delay means 24 to the input, to provide successive amplification of the pulse for each trip around the circuit.

During each repetition around the circuit, the pulse tends to build up a biasing voltage across resistor 16 which charges condenser 14. After a predetermined number of repetitions dependent upon the amplitude of the input signal, the bias of triode 10 is increased by the charge on condenser 14 to such a value that the tube operates as a detector, detecting the intermediate frequency pulse. This detected pulse appearing at anode 17 will not pass over a series resonant circuit 22 but is passed through radio and intermediate frequency choke coil 25, and low frequency input transformer 26, via line 27, to the input where it is applied through inductance coils 23 and 4, and delay means 24 to the grid 9 of tube 10. This detected pulse is then amplified in passing through the circuit a repeated number of times, further building up voltage on condenser 14. When the voltage on condenser 14 is built up to a sufficiently high value, it serves to break down gas tube 28, substantially removing the bias from tube 10 and returning it to its original condition while passing a pulse on to a suitable output utilization device. Anode 17 is of course connected through a load resistor 30 to the usual side of a source of anode voltage B+.

Assuming that the spacing between the transmitter and receiver is fixed and the incoming signal is a continuous amplitude modulated carrier signal, the number of output pulses from 28 produced per given time, will vary in accordance with the amplitude of the input signals. It will be seen that if the input signals are of large amplitude it will take relatively few repetitions thereof to shift the operating characteristic of the tube for detection of the mixed R. F. signal and local oscillations, and for subsequent operations and therefore in a relatively short time tube 28 will fire and produce an output pulse. On the other hand, if the input signals are of small amplitude it will take many recyclings of the input signals before the bias of the tube is shifted through its various cycling conditions and it will take a relatively longer period for the signals to break down tube 28 to produce an output pulse. The utilization device may then include a low pass filter to integrate these output pulses thus producing a wave varying in amplitude in accordance with the amplitude of the received signals, this wave then being applied to a sound reproducer.

If the incoming signal is a pulse repetition rate or pulse number modulated carrier signal the same type of utilization device may be employed, providing succeeding pulses, at their closest proximity, are spaced sufficiently so as not to interfere with each other during the recycling of the signal through the above-described receiver. By pulse repetition rate or pulse number modulation reference is made to transmission systems in which the number of pulses transmitted for a given period is varied in accordance with the amplitude of the intelligence to be conveyed. It will be seen that with pulse transmission of the type just mentioned an output pulse will be produced for each input pulse, which may be then integrated to reproduce the original intelligence wave. This system will also operate with pulsed amplitude modulated carrier signals provided that the period between succeeding incoming pulses is very much less than the period required for an input pulse to travel from the input of the receiver out through gas tube 28. If the incoming signal is a pulse position modulated signal then the utilization device 29 may comprise a suitable pulse position demodulator the output of which is fed for example, to a sound reproducer. In this latter instance the closest spacing of the incoming pulses should be such as not to cause interference therebetween in the recycling operations through the above-described receiver.

Figure 2:
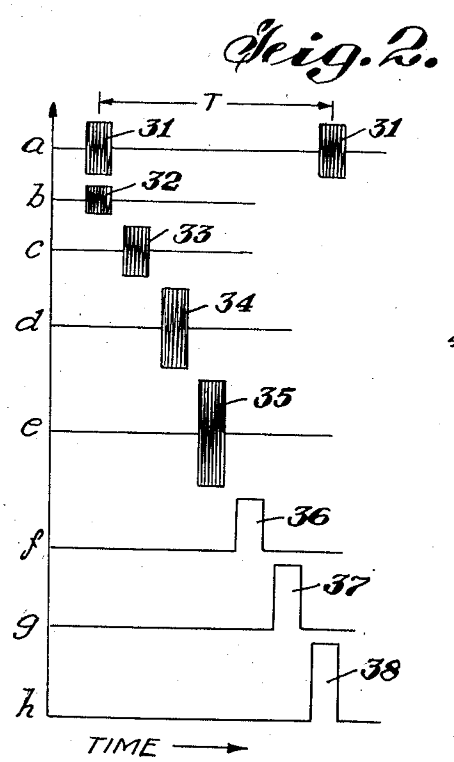
Fig. 2 is a graphical time chart representation of the operation of the circuit of Fig. 1.

Turning to Figure 2, the operation of the circuit shown in Figure 1 may be more clearly understood. In curve *a* two pulses 31, are shown separated by a time period T. This represents the radio frequency energy received in the circuit which is mixed with local oscillation as previously described. Each pulse 31 is converted into intermediate frequency pulse 32, shown in curve *b*, having substantially the same time position as the pulse 31. This pulse may be amplified a number of times with different time positions as shown in curves *c*, *d* and *e* at 33, 34 and 35. After these three repetitions, for example, or any number for which the circuit is designed, pulse 35 is rectified producing the envelope shown at 36. This pulse may then be amplified as shown in curves *g* and *h* at 37, 38. The time delay in the feedback circuit must be equal to or greater than the pulse duration and the delay line band width must be sufficient to pass most of the frequency components of the pulse for the intermediate and audio envelope frequency amplification. The various repetitions of the pulse through the circuit must all occur before a succeeding radio frequency pulse is applied. When the delay is made materially greater than the pulse width, the band width requirements of the system are less stringent since then amplitude distortion may be permitted so that the pulse may be rounded without causing the pulses to overlap one another. The tube used in this system should have characteristics such that it will operate well at radio frequency, intermediate frequency or audio frequency amplification. The delay means as shown may be of any desired type. An electron multiplier or orbital beam tube will provide a delay means that is adjustable and has a very broadband width characteristic.

Figure 3:
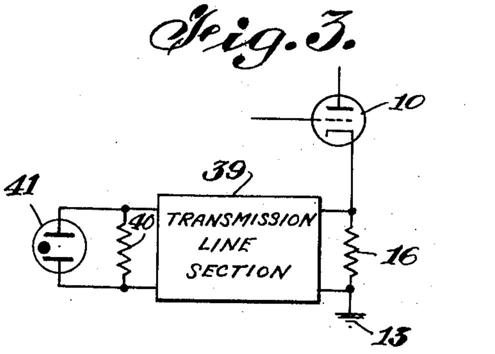
Fig. 3 is a modified grid biasing arrangement which may be used in place of the circuit shown in Fig. 1.

As shown in Fig. 1, the tube once biased for detection will remain biased substantially to this same value for the subsequent audio frequency amplification. However, it may be desired in some cases to provide a means for momentarily biasing the tube to detection condition and returning it again to the linear portion of the characteristic curve for the subsequent amplification functions. In Fig. 3 is shown an alternative biasing arrangement which may serve this purpose. In this arrangement the storage condenser 14 is dispensed with and in its place is provided a transmission line section 39 terminated in a resistance 38 equal to the characteristic impedance of the line. Thus, at each repetition of the pulse through the tube 1, the voltage across resistance 16 is increased because of the amplification in the tube. This voltage, however, travels out over line 39 and is absorbed in terminating resistor 40. However, upon reaching a predetermined value the voltage in line 39 will be sufficient to break down gas tube 41 causing a short circuit of resistor 38 and a reflection of the pulse back. This reflected pulse then produces across resistor 16 a negative bias which will shift the tube into condition for detection. After this shift, however, the tube will immediately be returned to its former bias, serving for linear amplification.

Figure 4:
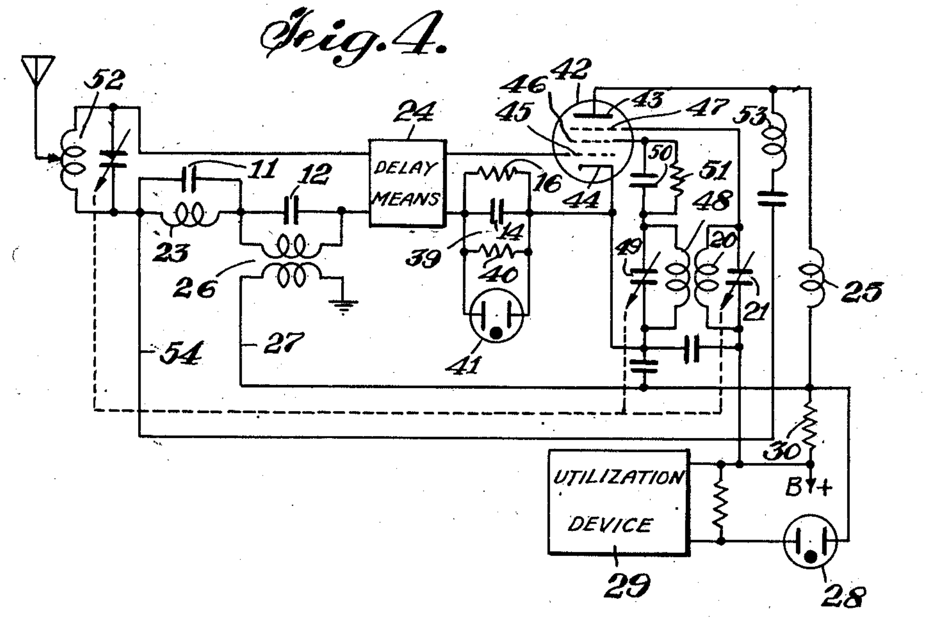
Fig. 4 is a schematic diagram of an alternative superheterodyne oscillator circuit incorporating the features of my invention.

In Figure 4 is shown an alternative arrangement utilizing a pentode tube 42 having an anode 43, cathode 44 and first, second and third grids 45, 46 and 47 in place of the triode shown in Fig. 1. Grids 46 and 47 are coupled together to provide a local blocking oscillator producing oscillations at properly timed spaced intervals. For this purpose the feedback coil 20 tuned by condenser 21 which is connected in series with grid 47 is coupled to a coil 48 tuned by a condenser 49 back to the grid 46 via grid condenser 50 shunted by resistor 51.

An incoming radio frequency signal is applied over antenna 1, R. F. tuned circuit 52, and delay means 24 between the first grid 45 and cathode 44. This mixed with the energy from the local oscillator circuit produces an intermediate frequency which is selected by resonant circuit 53 and passed back to the input I. F. coil 23. Repeated I. F. amplification occurs until the self-biasing circuit 14, 16 in the cathode is placed at detecting potential by action of the transmission line 39, resistor 40 and gas tube 41 as described in connection with Fig. 3. The envelope audio frequency pulse is then repeated through R. F. choke 25, line 27 and input transformer 26 in a predetermined cycle until sufficient voltage is developed across the anode resistor 30 to break down the gas tube 28 as described in connection with Fig. 1. These output pulses may then be translated into an audio frequency wave signal in any desired manner.

Figure 5:
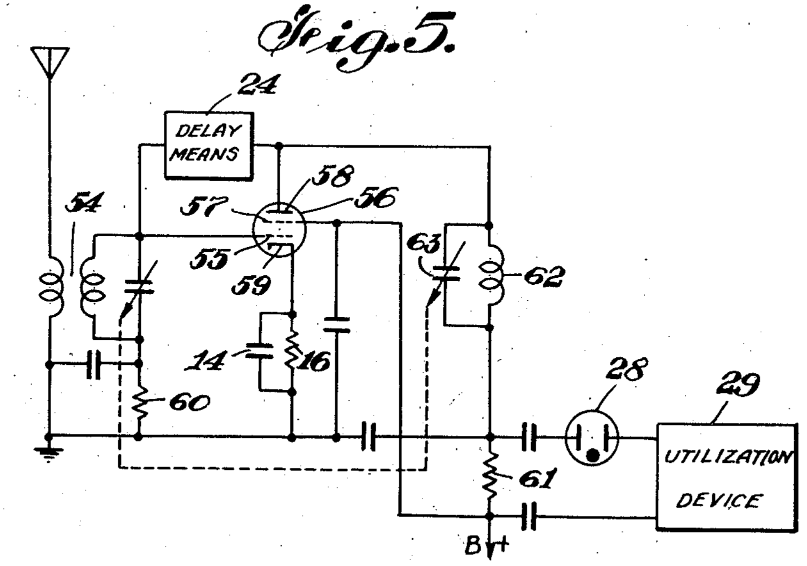
Fig. 5 is a schematic diagram of a tuned radio frequency circuit incorporating the features of my invention.

In Figure 5 is shown an alternative arrangement utilizing a tuned radio frequency circuit rather than a heterodyne arrangement. In this circuit no oscillating function is desired. The radio frequency pulses are applied over antenna 1 and tuned input transformer 54 to the controller first grid 55 of a tetrode 56 having a screen grid 57 and an anode 58. Each amplified R. F. pulse is passed from the anode 58 through delay means 24 to grid 55 for reamplification. This repetition continues until the radio frequency pulse is audio detected as a result of the bias built up in biasing circuit 14, 16, which is connected to the cathode 59 of the tube which causes the tetrode to operate as a detector. This detected pulse is fed back for repeated amplification via delay means 24, the circuit acting as a class C amplifier. The detected pulse that is fed back by delay means 24 to grid 55 also appears across resistor 61 which acts as the load impedance for the detected pulse and the amplifications thereof. The detected pulse passes through coil 62 with substantially no attenuation. The coil 62 is tuned by condenser 63 to the incoming R. F. frequency and together this coil and condenser form a resonant circuit across which the R. F. voltages appear. This resonant circuit serves to prevent the R. F. voltages from appearing across resistor 61 and breaking down the gas tube 28 to produce a false output in the utilization device 29. Resistor 60 is provided to complete the D. C. path between grid 55 and cathode 59. The amplification of the detected pulse continues until the voltage developed across resistor 61 is sufficient to fire gas tube 28 whereupon an output pulse is applied to utilization device 29. If tetrode 56 is of the electron multiplier type having an appreciable delaying action it may be possible to dispense with the separate delay device 24. The system described in Fig. 5 is particularly adapted for the reception of amplitude modulated pulse, width modulated pulse and position modulated pulse carrier signals.

While we have outlined above a few embodiments incorporating the features of our invention, it will be obvious to those skilled in the art that many modifications may be made therein. For example while we have referred to electron tubes throughout this specification, as will be apparent to those versed in the art, other amplifying devices, such as the crystal type referred to as "transitors" may in certain instances be used in place thereof. Different types of utilization devices may likewise be employed. It should, therefore, be distinctly understood that the specific circuits described herein are given merely by way of illustration and are not to be considered as limitations on the scope of our invention.

What is claimed is:

1. In an electrical system, a translating device, means conditioning said device to pass energy therethrough while performing a first function thereon, means for applying energy to the input of said device for operation thereon by said device according to said first function, means for repeatedly feeding back energy in successive separate operations from the output of said device to the input thereof for further operations thereon according to said first function and means electrically coupled to said device and responsive to a characteristic of said energy resulting from the repeated translation of said energy through said device, for varying said conditioning to cause said device to pass energy therethrough while performing a second function on said energy.

2. An electrical system according to claim 1 wherein said means for conditioning said device comprises means responsive to an amplitude characteristic of said energy for controlling the conditioning of said device.

3. An electrical system according to claim 1 wherein said energy feedback is in the form of a pulse and said feedback means includes a delay device having a value greater than the duration of said pulse.

4. An electrical system according to claim 1 wherein said translating device is an electron discharge tube.

5. A system according to claim 4 wherein said means for conditioning said tube to perform a second function comprises biasing means responsive to an amplitude characteristic of said energy for varying the bias of said tube.

6. A system according to claim 4 further comprising means coupled to said tube to operate therewith as a triggered blocking oscillator tuned to a frequency substantially different from the frequency of the energy applied to the input of said tube, said frequency being mixed in said tube to provide at the output of said tube pulses of intermediate frequency.

7. In an electrical system, an electron discharge tube, means conditioning said tube to pass energy therethrough while performing a first function, means for applying energy to the input of said tube for operation thereon by said tube according to said first function, means for repeatedly feeding back energy in successive, separate operations from the output of said tube to the input thereof for further operations thereon according to said first function, means electrically coupled to said tube and responsive to a characteristic of said energy resulting from the repeated translation of said energy through said tube, for varying said conditioning to cause said tube to pass energy therethrough while performing a second function thereon, means coupled to said tube to operate therewith as a triggered blocking oscillator tuned to a frequency substantially different from the frequency of the energy applied to the input of said tube, said frequency being mixed in said tube to provide at the output of said tube pulses of intermediate frequency, said feedback means comprising means for feeding back the intermediate frequency pulses to the input of said tube and said conditioning means including means responsive to the intermediate frequency pulse resulting from said mixing to bias said tube for repeated amplification of said intermediate frequency pulse.

8. A system according to claim 7 wherein said conditioning means is responsive to an amplitude characteristic of the repeatedly amplified intermediate frequency pulse to bias said tube for detection and further including means for feeding back the detected pulse to the input of said tube for repeated audio-amplification thereof in said tube, the entire cycle of operations occurring at a superaudible rate.

9. A system according to claim 1 wherein the energy applied to said system is in the form of a continuous wave and said means for applying energy to the input of said device includes means associated with said device for selecting a portion of the incoming signal to provide an input pulse.

10. A system according to claim 1 further including means for subsequently producing an output signal pulse and for restoring said translating device to its initial condition whereby the cycle of operation may be repeated.

11. A system according to claim 10 wherein said producing means includes a gas discharge member coupled to the output of said device and to said conditioning means.

12. In an electrical system, a translating device, means conditioning said device to pass energy therethrough while performing a first function thereon, means for applying energy to the input of said device for operation thereon by said device according to said first function, means for repeatedly feeding back energy in successive separate operations from the output of said device to the input thereof for further operations thereon according to said first function and means electrically coupled to said device and responsive to a characteristic of said energy resulting from the repeated translation of said energy through said device, for varying said conditioning to cause said device to pass energy therethrough while performing a second function on said energy, the energy fed back from the output of said device to the input thereof being in the form of a pulse and said device together with said feedback means including means introducing a delay in the energy feedback having a value greater than the duration of said pulse.

13. In an electrical system, a translating device, means conditioning said device to pass energy therethrough while performing a first function thereon, means for applying energy to the input of said device for operation thereon by said device according to said first function, means for repeatedly feeding back energy in successive separate operations from the output of said device to the input thereof for further operations thereon according to said first function and means electrically coupled to said device and responsive to a characteristic of said energy resulting from the repeated translation of said energy through said device, for varying said conditioning to cause said device to pass energy therethrough while performing a second function on said energy, said translating device being an amplifier as conditioned to perform said first function and a detector as conditioned to perform said second function.

14. In an electrical system, a translating device, means conditioning said device to pass energy therethrough while performing a first function thereon, means for applying energy to the input of said device for operation thereon by said device according to said first function, means for repeatedly feeding back energy in successive separate operations from the output of said device to the input thereof for further operations thereon according to said first function and means electrically coupled to said device and responsive to a characteristic of said energy resulting from the repeated translation of said energy through said device, for varying said conditioning to cause said device to pass energy therethrough while performing a second function on said energy, said translating device being an electron discharge tube, said tube as conditioned for said first function being an amplifier, and as conditioned for said second function being a detector.

15. In an electrical system, a translating device, means conditioning said device to pass energy therethrough while performing a first function thereon, means for applying energy to the input of said device for operation thereon by said device according to said first function, means for repeatedly feeding back energy in successive separate operations from the output of said device to the input thereof for further operations thereon according to said first function and means electrically coupled to said device and responsive to a characteristic of said energy resulting from the repeated translation of said energy through said device, for varying said conditioning to cause said device to pass energy therethrough while performing a second function on said energy, said translating device being a tube and the energy fed back from the output of said tube to the input thereof being in the form of a pulse, and said conditioning means being adapted to control the bias of said tube and including a cathode resistor, a transmission line section terminating in a matching impedance and connected across said cathode resistor, the pulse appearing across said resistor being absorbed without reflection in said impedance, and a gaseous discharge tube connected across said terminating impedance and adapted to discharge upon appearance of a pulse across said resistance having an amplitude greater than a predetermined amplitude to cause reflection of said greater pulse back across said resistance to vary the operational function of said tube.

16. In an electrical system, a translating device, means conditioning said device to pass energy therethrough while performing a first function thereon, means for applying energy to the input of said device for operation thereon by said device according to said first function, means for repeatedly feeding back energy in successive separate operations from the output of said device to the input thereof for further operations thereon according to said first function and means electrically coupled to said device and responsive to a characteristic of said energy resulting from the repeated translation of said energy through said device, for varying said conditioning to cause said device to pass energy therethrough while performing a second function on said energy, said translating device being a multi-electrode tube, means coupling selected electrodes of said tube to provide a blocking oscillator, said applying means including means for applying the input energy to an electrode of said tube, the input energy and the locally generated oscillations being mixed in said tube to produce an intermediate frequency energy, and means for feeding back the intermediate frequency energy from an output of said tube to the input thereof for repeated amplification of said intermediate frequency energy.

EDWARD D. PHINNEY.
ROBERT S. BAILEY.

References Cited in the file of this patent

UNITED STATES PATENTS

| Number | Name | Date |
|---|---|---|
| 1,933,976 | Hanson | Nov. 7, 1933 |
| 2,005,789 | Koch | June 25, 1935 |
| 2,297,618 | Grimes | Sept. 29, 1942 |
| 2,464,259 | Proskauer | Mar. 15, 1949 |